(12) United States Patent
Dolby et al.

(10) Patent No.: US 11,586,533 B2
(45) Date of Patent: Feb. 21, 2023

(54) CREATING A MOCK FOR AN INTEGRATION FLOW

(71) Applicant: International Business Machines Corporation, Armonk, NY (US)

(72) Inventors: Trevor Clifford Dolby, Southampton (GB); John Anthony Reeve, Winchester (GB); Andrew John Coleman, Petersfield (GB); Matthew E. Golby-Kirk, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/026,681

(22) Filed: Sep. 21, 2020

(65) Prior Publication Data

US 2022/0091971 A1   Mar. 24, 2022

(51) Int. Cl.
  *G06F 11/36*     (2006.01)
  *G06F 9/54*      (2006.01)

(52) U.S. Cl.
  CPC .......... *G06F 11/3688* (2013.01); *G06F 9/546* (2013.01)

(58) Field of Classification Search
  None
  See application file for complete search history.

(56) References Cited

U.S. PATENT DOCUMENTS

| | | | |
|---|---|---|---|
| 8,627,296 B1 | 1/2014 | Picard | |
| 9,009,676 B2 * | 4/2015 | Chua | G06F 11/3414 717/127 |
| 10,534,680 B1 * | 1/2020 | Wood | G06F 11/3466 |
| 11,093,367 B2 * | 8/2021 | Kim | H04L 43/50 |
| 2005/0223367 A1 * | 10/2005 | Smith | G06F 11/3636 717/128 |
| 2006/0047496 A1 | 3/2006 | Genkin et al. | |
| 2006/0140362 A1 * | 6/2006 | Hickson | G06F 9/546 379/88.22 |
| 2008/0155334 A1 * | 6/2008 | Mills | G06F 11/261 714/37 |
| 2008/0163143 A1 * | 7/2008 | Kwon | G06F 30/33 716/107 |
| 2011/0067036 A1 * | 3/2011 | Hickford | G09B 29/00 719/314 |
| 2015/0212920 A1 * | 7/2015 | Kraus | G06F 11/36 717/127 |

(Continued)

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

(Continued)

*Primary Examiner* — Philip Wang
(74) *Attorney, Agent, or Firm* — Peter Edwards

(57) ABSTRACT

Concepts for creating a mock for an integration flow are presented. One example comprises analyzing a response to each of a plurality of requests from an integration flow and determining whether or not an identifying property of each of the plurality of requests is present in the response. The method then comprises, responsive to determining that the identifying property is present in the response, generating a mock with an associated matcher based on the plurality of requests.

20 Claims, 7 Drawing Sheets

(56) References Cited

U.S. PATENT DOCUMENTS

| | | | | |
|---|---|---|---|---|
| 2016/0182645 A1* | 6/2016 | Panec | ................... | H04L 67/146 |
| | | | | 709/227 |
| 2016/0267223 A1* | 9/2016 | Allen | ..................... | G16H 10/60 |
| 2018/0121330 A1 | 5/2018 | Clark | | |
| 2018/0365140 A1* | 12/2018 | Bates | ...................... | H04L 43/50 |
| 2019/0155721 A1* | 5/2019 | Reeve | ................ | G06F 11/3692 |

OTHER PUBLICATIONS

Bloom, "Mock Server," Printed Sep. 17, 2020, 9 pages, http://www.mock-server.com/.

\* cited by examiner

CREATING A MOCK FOR AN INTEGRATION FLOW

BACKGROUND

Traditional integration flows are used to connect multiple systems together. Testing the integration logic of an integration flow typically relies on every connected system associated with the flow being available, which often requires a high complexity in preparing the testing and may be difficult to achieve. In order to mitigate the reliance on every system being available, software mocking can be used.

Traditional software mocking, or "mocking," is a well-known technique for eliminating dependence on actual services when testing integration logic of an integration flow. A mock simulates the behavior of a real method/object in controlled ways. The mock often comprises associated matchers, which are simulations of exact values (i.e., data) used by the mock. A software developer is typically responsible for constructing the mock and ensuring it remains current (i.e., ensuring that the mock actually reflects the current system it is meant to imitate).

Integration flows typically contain messages travelling through the flow, with each message comprising requests and/or replies. Each request and/or reply may include request and/or reply identifier (IDs), created either by the integration flow engine itself or by underlying transports, that require the mock to handle transient data that is of no interest to an application within the integration flow but does cause variation. Despite the values not being of any use to the applications, the integration flow may depend on the reply containing correlation data from the request.

SUMMARY

Some embodiments of the present disclosure can be illustrated as a method. The method comprises analyzing a response to each of a plurality of requests from an integration flow and determining whether or not an identifying property of each of the plurality of requests is present in the response. The method then comprises, responsive to determining that the identifying property is present in the response, generating a mock with an associated matcher based on the plurality of requests.

Some embodiments of the present disclosure can be illustrated as a system for creating a mock for an integration flow. The system comprises a response analysis unit configured to analyze a response to each of a plurality of requests from an integration flow and a property analysis unit configured to determine whether or not an identifying property of each of the plurality of requests is present in the response. The system further comprises a mock generating unit configured to, responsive to determining that the identifying property is present in the response, generate a mock with an associated matcher based on the plurality of requests.

Some embodiments of the present disclosure can be illustrated as a computer program product for creating a mock for an integration flow. The computer program product comprises a computer readable storage medium having program instructions embodied therewith, the program instructions executable by a processing unit to cause the processing unit to perform a method according to a proposed embodiment.

Some embodiments of the present disclosure can be illustrated as a processing system comprising at least one processor and the computer program product according to an embodiment. The at least one processor is adapted to execute the computer program code of said computer program product.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

Figure 1:
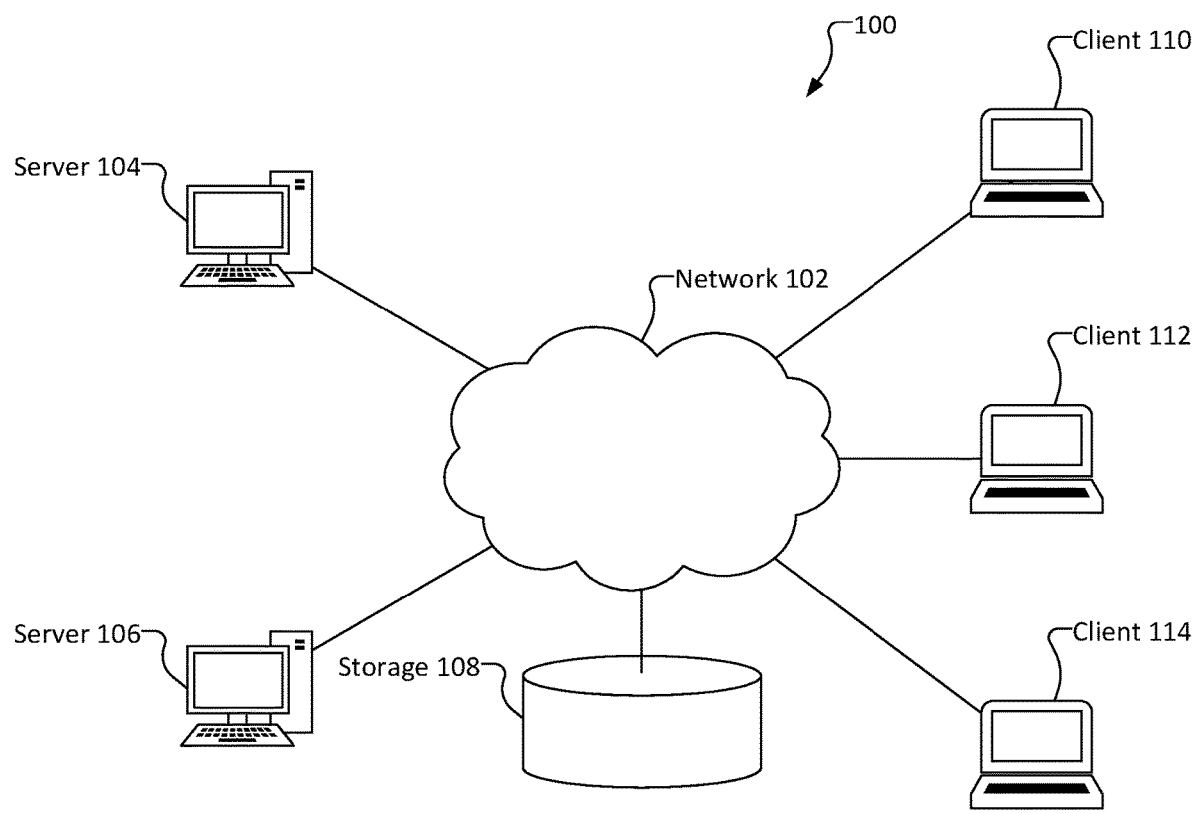
FIG. 1 depicts a pictorial representation of an exemplary distributed data processing system in which aspects of the illustrative embodiments may be implemented.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to systems and methods to generating a mock for an integration flow. More particular aspects relate to a system to send requests to a connected system, receive and analyze responses to the requests from the connected system, and, based on the analyzed responses, generate a mock of the connected system.

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

In addition to mock construction typically being complicated and potentially error-prone, integration flows are often used to interact with systems that are poorly-specified and change over time, resulting in any mocks of such systems becoming out-of-date relatively quickly. Preventing this requires regeneration (or at least revalidation) of the mocks and matchers, which leads to more manual effort.

On top of the functional (e.g. data format) issues with mocks for integration flows, replication of timing and failure characteristics is also important but complicated to implement. Integration flows often have strict service-level agreements (SLAs) and therefore mocks created for integration flows typically require strict levels of compliance.

Traditional systems for creating mocks implement mocking for HyperText Transfer Protocol (HTTP) endpoints. However, the mocks do not include arbitrary services accessible from integration flows over multiple transports. High levels of manual work to create a complex mock are also often required. Other traditional systems implement mock services available by way of network endpoints. However, activity resulting from the mock is network-based and consequently requires a separate server.

Concepts for creating a mock for an integration flow are proposed. Such concepts may enable automatic creation and revalidation of test mocks and associated matchers for an integration flow. Accordingly, embodiments may automatically create mocks that are able to be validated by recording system interactions, by means of an integration engine in a system-independent way (e.g. using a general purpose message tree format).

Such concepts may involve a concept of identifying common aspects of a plurality of requests, where the plurality of requests are compared to each other to identify sections of the requests that vary (i.e. points of variability). The sections that vary may then be compared to the responses associated with each of the requests to identify how to construct simulated replies from the requests using the points of variability that correlate between a request and a response (i.e. identifying properties).

Embodiments may be implemented in conjunction with a concept of revalidating the generated mock against real systems, for example by using the calculated request/reply correlation (i.e. the identifying properties of the request) to construct simulated requests. The simulated requests may be sent to the real systems to check that the received replies associated with the simulated requests conform to the generated mock.

Embodiments may be implemented in conjunction with autocorrelation mocking based on comparing request and reply identifiers across multiple invocations and identifying common aspects between them. Identification of a request/reply correlation may then be used to revalidate the mock against real systems. The mock can be run by the user, instead of requiring a mock provided by a third-party cloud offering.

Embodiments may be implemented in conjunction with: a target service to be mocked; an integration flow calling the target service and that uses the generated mock; a component mock manager configured to record data, create a mock, and revalidate the created mock; and a mock store for storing generated mocks used by the component mock manager Once the mock is created, the integration flow may no longer call the actual target service, but may instead use the mock service created by the component mock manager.

Information relating to points of variability between requests sent between services through an integration flow may be obtained and then used to create a mock for testing the integration flow and associated services. The information required for creating the mock may vary between the requests and may correlate between each request and its corresponding response(s). Correlated information may refer to information that may be found in both a request and its corresponding response(s), such that the mock may be created by generating simulated responses based on the correlated information found in the actual requests.

Some embodiments may employ a concept of testing an integration flow by way of mocking. The integration flow may be a programming construct for integrating external systems. Creating a mock for an integration flow based on a plurality of requests and their associated identifying properties may enable testing of errors and timeouts (often important in aggregation scenarios). This may ensure that compliance towards strict service-level agreements may be met without needing to replicate the whole set of services associated with the integration flow.

In some embodiments, a system may determine whether or not an identifying property of each of the plurality of requests is present in the response by first identifying a difference between a first request and a second request of the plurality of requests. The system may then determine whether or not the difference is present between a first response and a second response corresponding to the first request and the second request, respectively. In this way, an identified point of variability (i.e. a difference) between the plurality of requests may be assessed to determine whether it correlates between the request and a corresponding response. This may advantageously enable mocking for an integration flow by matching an identifying property of a request and a response. As a result, the mock may be generated using this information, such that the mock may simulate the actual service with improved accuracy and reliability.

Analyzing a first request and a second request of the plurality of requests from the integration flow and identifying a difference between them may enable identifying a point of variability between the first request and the second request. This may enable marking a request with a unique identifying property, such that the request may be simulated when generating a mock. This may improve the accuracy and reliability of the mock.

In some embodiments, determining whether or not the difference is present between a first response and a second response (corresponding to the first request and the second request, respectively) may comprise identifying whether or not the difference correlates with the first response and the second response. This may further comprise, responsive to identifying that the difference correlates with the first response and the second response, categorizing the difference as an identifying property and, responsive to identifying that the difference does not correlate with the first response and the second response, ignoring the difference. In this way, the mock may be generated using a request that may comprise an identifying property that may correlate with the associated response. As a result, the accuracy and reliability of the mock may be improved.

The identifying property of each of the plurality of requests may comprise at least one of a correlation identifier, a message identifier, and a request type. In this way, the scope of the variety of identifying properties is increased, such that the mock may be generated with improved reliability and efficacy. The correlation identifier, message identifier, and request type may be properties of each of the plurality of requests that vary between requests and correlate between each request and its corresponding response. Consequently, generating the mock by using the identifying property of each of the plurality of requests may improve the accuracy and reliability of the mock.

In some embodiments, the difference that does not correlate with the first response and the second response may comprise a timestamp. In this way, points of variability (i.e. differences) in a request that may not be shared between the request and a corresponding response (i.e. that do not correlate between the request and the response) may not be used for generating the mock and instead may be ignored. As a result, only information that may correlate between the request and the response may be used to generate the mock, such that the mock may be generated with improved accuracy and reliability.

In some embodiments, generating a mock with an associated matcher based on the plurality of requests may comprise generating a callable flow comprising the associated matcher based on the plurality of requests and returning expected data by way of the generated callable flow to the integration flow. In this way, the expected data returned to the integration flow may be generated using the identifying properties of the requests and the associated responses. As a result, the accuracy and reliability of the expected data may be improved, which may mitigate the dependence on actual services when testing integration logic of the integration flow. The generated mock may enable "zero prerequisite" testing for complex scenarios, which may consequently enable integration flows to be modified and revalidated without requiring live systems. This is particularly useful for hybrid cloud deployments, where the actual runtime location of an integration flow may not be known in advance and/or setting up actual back-end systems may be difficult or impossible.

In some embodiments, generating a mock with an associated matcher based on the plurality of requests may comprise generating the mock with an associated matcher by generating a simulated response to each of the plurality of requests based on the identifying property of each of the plurality of requests. In this way, the simulated response may be generated using information retrieved from the actual requests (i.e., the identifying properties). This may improve the accuracy and efficacy of generating the simulated response, which may improve the reliability of the generated mock. The identifying property may enable the generated mock to create valid response messages based on the input (i.e., the actual requests), without requiring constructing a separate mock or risking responses being sent back to the wrong receiver.

In some embodiments, the identifying property may be correlated with the simulated response. In this way, the simulated response may be generated using a request that may comprise an identifying property that may correlate with the associated actual response. As a result, the accuracy and reliability of the mock may be improved.

In some embodiments, there is a method for revalidating a created mock for an integration flow. The method may comprise creating a mock for an integration flow and generating a simulated request based on the identifying property of each of the plurality of requests from the integration flow. The method may further comprise sending the simulated request to a real system and revalidating the created mock by assessing a response from the real system corresponding to the simulated request against a response from the created mock. In this way, the generated mocks may be revalidated, which may ensure that the generated mocks may be up to date and maintain a high level of accuracy in simulating the actual service for the integration flow. As a result, the generated mock may be revalidated immediately after generation to verify correctness and/or later to ensure that the system itself may not have changed in an incompatible way.

FIG. 1 depicts a pictorial representation of an exemplary distributed data processing system 100 in which aspects of the illustrative embodiments may be implemented. Distributed data processing system 100 may include a network of computers in which aspects of the illustrative embodiments may be implemented. Distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, a first server 104 and a second server 106 are connected to the network 102 along with a storage unit 108. In addition, clients such as client 110, client 112, and client 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. Distributed data processing system 100 may include additional servers, clients, and other devices not shown in FIG. 1.

In the depicted example, distributed data processing system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Figure 2:
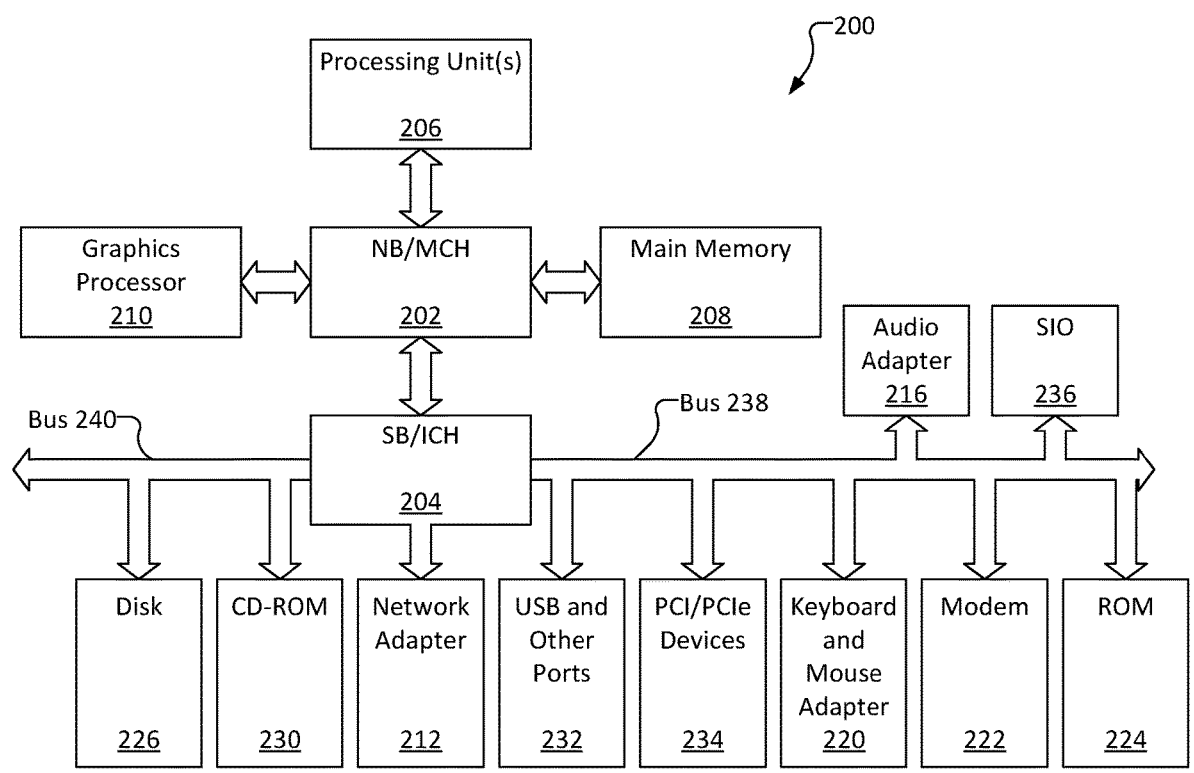
FIG. 2 is a block diagram of an example system in which aspects of the illustrative embodiments may be implemented.

FIG. 2 is a block diagram of an example system 200 in which aspects of the illustrative embodiments may be implemented. System 200 is an example of a computer, such as, for example, client 110 in FIG. 1, in which computer usable code or instructions implementing the processes for illustrative embodiments of the present invention may be located. For instance, system 200 may be configured to implement a response analysis unit, a property analysis unit, and a mock generating unit according to an embodiment.

In the depicted example, system 200 employs a hub architecture including a north bridge and memory controller hub (NB/MCH) 202 and a south bridge and input/output (I/O) controller hub (SB/ICH) 204. One or more processing unit(s) 206 (referred to as "processing unit 206" for brevity), a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, one or more universal serial bus (USB) ports and other communication ports 232, and PCI/PCIe devices 234 connect to the SB/ICH 204 through first bus 238 and second bus 240. PCI/PCIe devices 234 may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System p® computer system, running the Advanced Interactive Executive (AIX®) operating system or the LINUX® operating system. System 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIG. 1 and FIG. 2 may vary depending on the implementation. Other internal hardware or peripheral devices, such as flash memory, equivalent non-volatile memory, or optical disk drives and the like, may be used in addition to or in place of the hardware depicted in FIG. 1 and FIG. 2. Also, the processes of the illustrative embodiments may be applied to a multiprocessor data processing system, other than the system mentioned previously, without departing from the spirit and scope of the present invention.

Moreover, system 200 may take the form of any of a number of different data processing systems including client computing devices, server computing devices, a tablet computer, laptop computer, telephone or other communication device, a personal digital assistant (PDA), or the like. In some illustrative examples, system 200 may be a portable computing device that is configured with flash memory to provide non-volatile memory for storing operating system files and/or user-generated data, for example. Thus, system 200 may essentially be any known or later-developed data processing system without architectural limitation.

Figure 3:
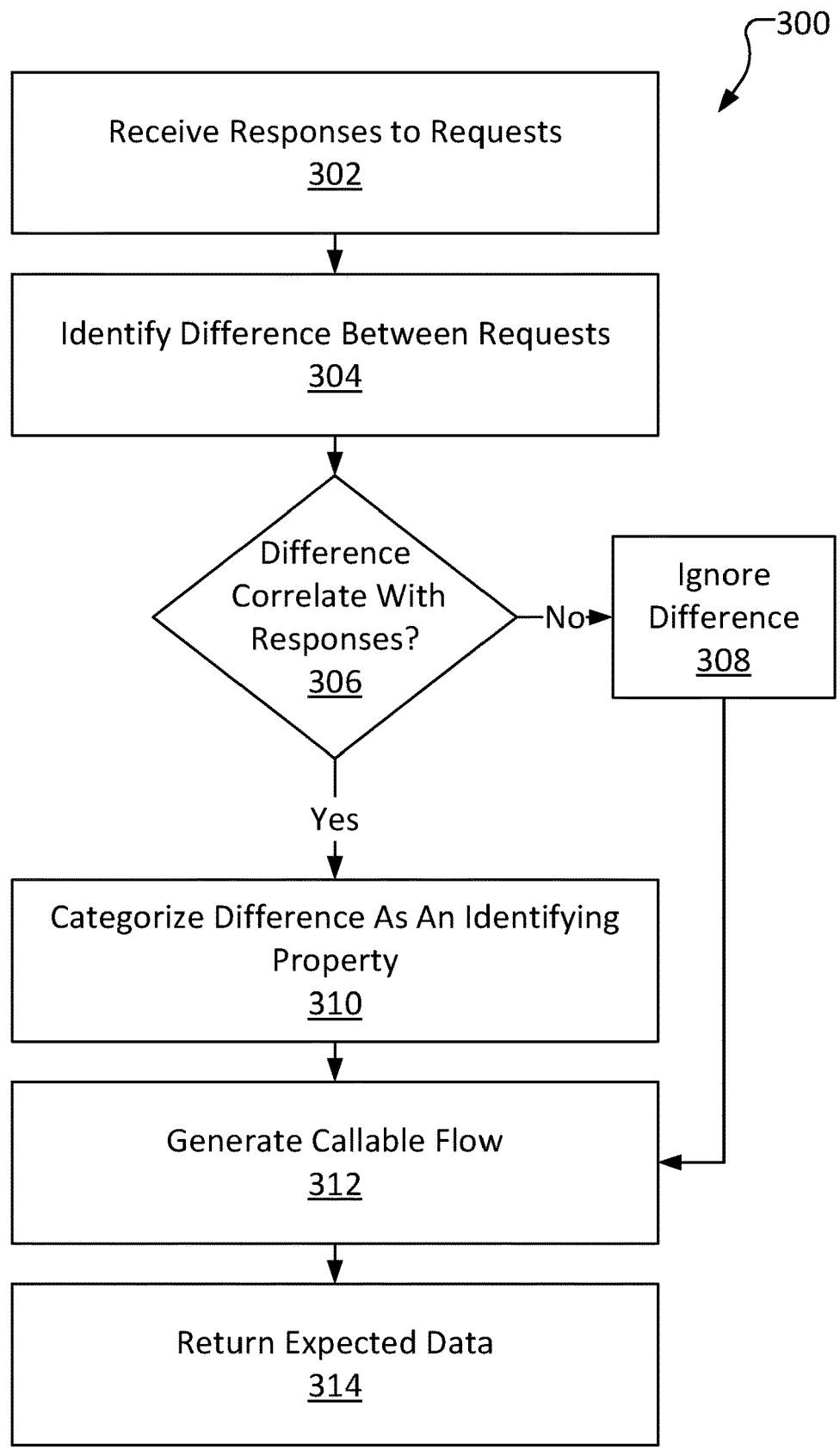
FIG. 3 is a high-level method for creating a mock for an integration flow.

FIG. 3 is a high-level method 300 for creating a mock for an integration flow. Method 300 includes receiving responses to a plurality of requests at operation 302. The responses may be received from a mock target such as, for example, an application or computer connected to a system performing method 300. The requests may have been sent via an integration flow. Method 300 further includes identifying a difference between a first request and a second request of the plurality of requests from the integration flow at operation 304. Operation 304 may include, for example, identifying a point of variation between the two requests (such as a common data field that has different values in the two requests).

Method 300 further includes determining whether the difference between the requests correlates with the responses to the requests at operation 306. Operation 306 may include, for example, determining whether data that varies between requests remains consistent between each request and its associated response. As an illustrative example, a data field containing a message ID may be identified as a difference via operation 304 (as a first request may have a first message ID while a second request may have a second, different message ID). Notably, a system performing method 300 may not know that the data contained in the data field is specifically a message ID; just that the data in the field differs between the two requests (as identified via operation 304). In such an example, operation 306 determines whether the first response (i.e., the response to the first request) includes the first message ID and the second response (i.e., the response to the second request) includes the second message ID. If this is the case, the difference is said to "correlate" with the responses (306 "Yes").

As an additional example, a data field containing a timestamp may also be identified as a difference via operation 304 (as the first request may have been transmitted at a first time while the second request may have been sent at a second, different time). Again, the system performing method 300 may not know that the data field includes a timestamp; only that the data contained within the data field differs between the two requests. In this example, operation 306 may include determining whether the first response includes the first timestamp and the second response includes the second timestamp. As a response is unlikely to be sent at the same time as the request it is responsive to, the timestamps will probably differ between response and request as well as between first request and second request. Thus, the difference is said to "not correlate" with the responses (306 "No").

If the difference does not correlate with the responses (306 "No"), method 300 further includes ignoring the difference at operation 308. Operation 308 may include, for example, categorizing the difference as unimportant/non-identifying.

If the difference does correlate with the responses (306 "Yes"), method 300 further includes categorizing the difference as an identifying property at operation 310. Operations 304-310 may be repeated until every difference is categorized.

By way of examples, the identifying property of each of the plurality of requests comprises at least one of a correlation identifier, a message identifier, and a request type.

By way of an example, the difference that does not correlate with the first response and the second response comprises a timestamp.

Method 300 further includes generating a callable flow comprising an associated matcher (a simulation of exact values (i.e., data) to be used by the mock) based on the plurality of requests at operation 312. Method 300 further includes returning expected data by way of the generated callable flow to the integration flow at operation 314.

Operations 312 and 314 may include generating the mock with an associated matcher by generating a simulated response to each of the plurality of requests based on the identifying property of each of the plurality of requests. Specifically, the identifying property may be correlated with the simulated response.

In an example, multiple messages (i.e. a plurality of requests) are recorded through an integration flow that interacts with a system to be mocked. The recorded messages provide the raw data for generating the mock and associated matchers. Next, points of variability (i.e. differences) that require special handling are identified in the requests (i.e. messages) by comparing the set of outgoing requests to find the parts of the requests that changed with each request, as well as examining the associated responses to determine which of the request parts consistently appear as correlated values in the response. Examples of the points of variability in the requests include, but are not limited to, timestamps, correlation identifiers (IDs), message IDs, and types of the requests.

The identified points of variability are then organized into two categories by detecting correlation information. The first category comprises points of variability that vary between requests and correlate between each request and its associated response message (i.e. identifying properties). Examples of points of variability that fall within the first category include, but are not limited to, correlation IDs, message IDs, and request types. The second category comprises points of variability that vary between requests and do not correlate between each request and its associated response message. As such, points of variability that fall within the second category are ignored. An example of such points of variability includes, but is not limited to, timestamps. In scenarios where it is not always possible to detect the points of variability, annotations on the message models are used by the mock to enable integration flow developers/engineers to add further information to the messages indicating what fields/properties of each message falls within the first category (i.e. correlated) or the second category (i.e. ignored).

Once the points of variability have been organized, a mock is created with associated matchers using the recorded data, specifically the plurality of requests associated with the identified points of variability that fall within the first category (i.e. identifying properties). The matchers are used to ensure the data from the integration flow matches the expectations of the system itself and the mock creates response messages that match those from the system itself.

In another example, determining whether or not an identifying property of each of the plurality of requests is present in the response is applied in an aggregation scenario, where tracking (i.e. recording) multiple requests and replies to and from the same endpoints can be complicated. Detecting the correlation information enables the mock to automatically create valid response messages based on the input (i.e. the plurality of requests associated with the identifying properties), without any need to construct separate mocks or risk responses being sent back to the wrong receiver.

Figure 4:
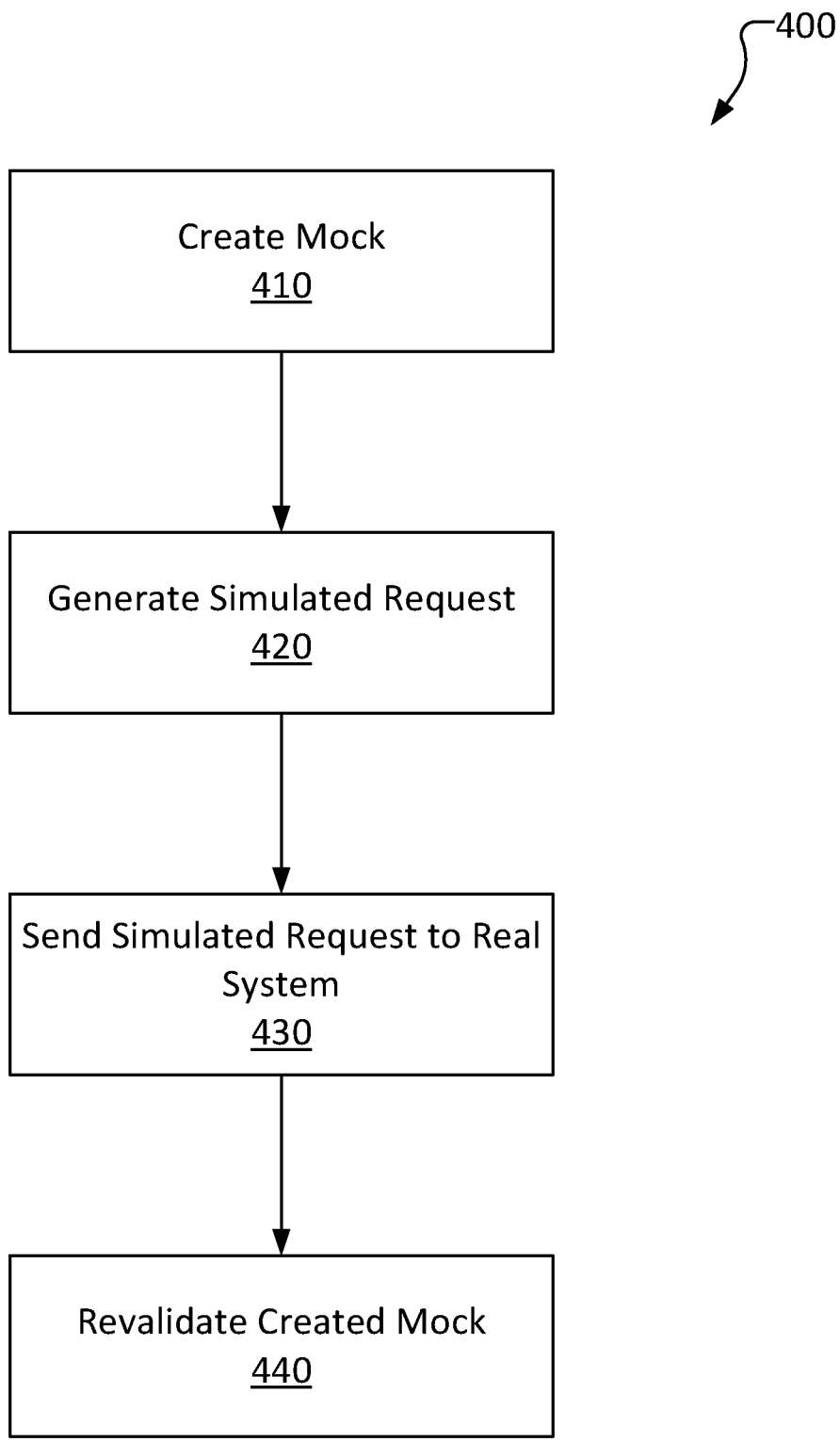
FIG. 4 is a high-level method for revalidating a created mock for an integration flow.

FIG. 4 is a high-level method 400 for revalidating a created mock for an integration flow. Method 400 comprises creating a mock for an integration flow at operation 410. Operation 410 may be performed in accordance with method 300 as depicted in FIG. 3.

Method 400 further comprises generating a simulated request based on the identifying property of each of the plurality of requests from the integration flow at operation 420. Method 400 further comprises sending the simulated request to a real system at operation 430. Method 400 further comprises revalidating the created mock by assessing a response from the real system corresponding to the simulated request against a response from the created mock at operation 440.

In an example, simulated data is auto-generated to be run against the actual system and compared against the mock. The simulated data is used immediately to revalidate the mock to verify correctness and later to ensure the system itself has not changed in an incompatible way. The generated mock and matchers are then used to validate integration flow behavior. Specifically, the matchers are used to ensure the integration flow sends correct data to the system and the mock is used to ensure the integration flow receives correct (simulated) data from the system. The matchers are periodically validated against the real system by way of the mock and the matchers.

In an example, the method is implemented in an integration engine without any need for an external fake (i.e. simulated) service provider. Consequently, the generated mock is revalidated on any test failure, assuming that the actual (i.e. real) service is accessible from the test container. If the revalidation failed, then the mock is regenerated. If the actual service unexpectedly or invalidly changes, an alert may be sent to the provider of the external server alerting them of the unexpected or invalid change.

Figure 5:
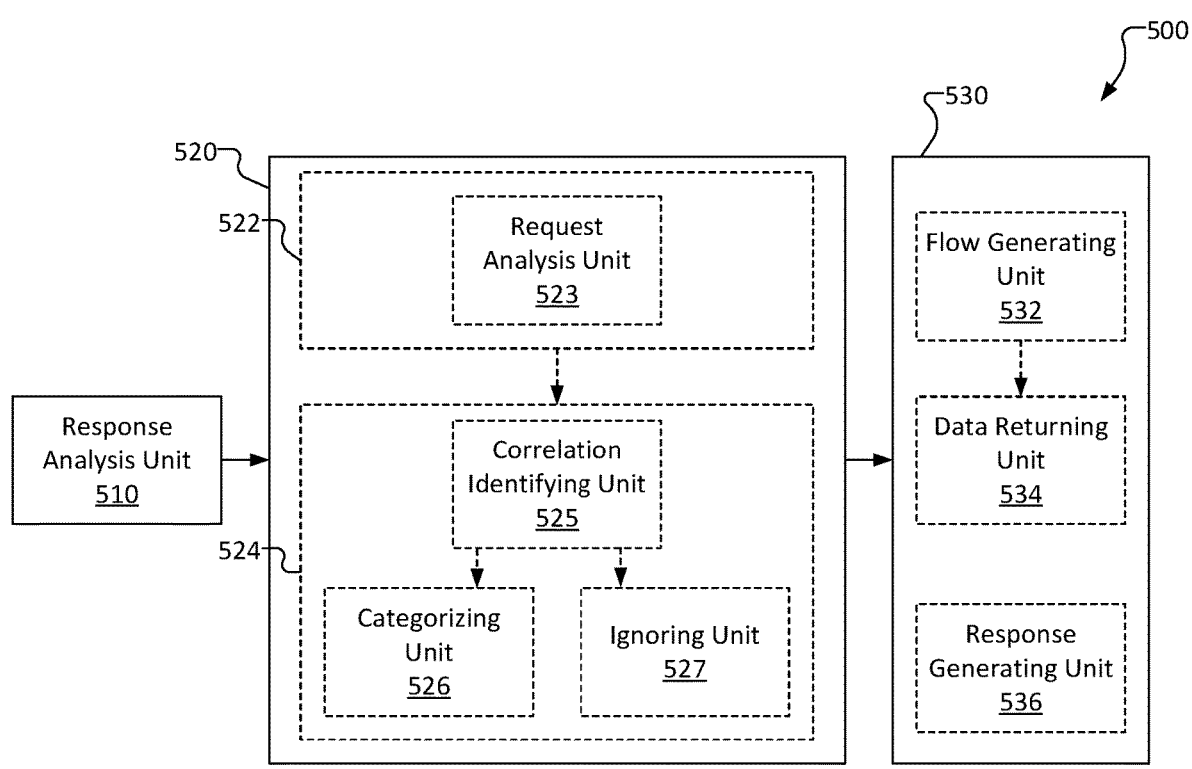
FIG. 5 illustrates a simplified block diagram of an exemplary embodiment of a system for creating a mock for an integration flow.

FIG. 5 illustrates a simplified block diagram of an exemplary embodiment of a system 500 for creating a mock for an integration flow.

System 500 comprises a response analysis unit 510 configured to analyze a response to each of a plurality of requests from an integration flow. System 500 further comprises a property analysis unit 520 configured to determine whether or not an identifying property of each of the plurality of requests is present in the response. System 500 further comprises a mock generating unit 530 configured to, responsive to determining that the identifying property is present in the response, generate a mock with an associated matcher based on the plurality of requests.

Here, the property analysis unit 520 comprises a difference identifying unit 522 configured to identify a difference between a first request and a second request of the plurality of requests. The property analysis unit 520 further comprises a difference analysis unit 524 configured to determine whether or not the difference is present between a first response and a second response corresponding to the first request and the second request.

In this embodiment, the difference identifying unit 522 comprises a request analysis unit 523 configured to analyze a first request and a second request of the plurality of requests from the integration flow. The difference identifying unit 522 is further configured to identify a difference between the first request and the second request.

In this embodiment, the difference analysis unit 524 comprises a correlation identifying unit 525 configured to identify whether or not the difference correlates with the first response and the second response. The difference analysis unit 524 further comprises a categorizing unit 526 configured to, responsive to identifying that the difference correlates with the first response and the second response, categorize the difference as an identifying property and an ignoring unit 527 configured to, responsive to identifying that the difference does not correlate with the first response and the second response, ignore the difference.

By way of examples, the identifying property of each of the plurality of requests comprises at least one of a correlation identifier, a message identifier, and a request type. By way of an example, the difference that does not correlate with the first response and the second response comprises a timestamp.

In this embodiment, the mock generating unit 530 comprises a flow generating unit 532 configured to generate a callable flow comprising the associated matcher based on the plurality of requests. The mock generating unit further comprises a data returning unit 534 configured to return expected data by way of the generated callable flow to the integration flow.

Here, the mock generating unit 530 comprises a response generating unit 536 configured to generate the mock with an associated matcher by generating a simulated response to each of the plurality of requests based on the identifying property of each of the plurality of requests.

Specifically, the identifying property is correlated with the simulated response.

In an example, a system comprises a target service to be mocked, an integration flow that calls the target service and uses the mock, and a component mock manager (i.e. the system for creating the mock for the integration flow). Using documented message recording capabilities, the integration flow calls the target service by way of standard messaging protocols. The messages received from the target service are sent to the component mock manager, specifically a response analysis unit 510. Next, a property analysis unit 520 records the messages and identifies variable data (i.e. points of variability) in the messages. The variable data is identified by comparing the outbound request messages with each other to find the fields in the messages that are difference in each case; these fields comprise the points of variability. For each request message, the property analysis unit 520 determines which of the points of variability reappear in the correlated response messages (i.e. by way of the correlation identifying unit 525) and marks these points of variability as correlated fields (i.e. identifying properties) by way of the categorizing unit 526 to be correlated in the mock. These points of variability are also marked as fields to be generated during revalidation of the mock. The other points of variability (i.e. the second category of points of variability) are marked as fields to be ignored in matching by way of the ignoring unit 527.

In an example, the mock generating unit 530 creates a mock comprises generating a callable flow that has the associated matchers contained with the integration flow logic and returning the expected data back to the original integration flow. The callable flow replaces any node in the integration flow, which enables providing the mocking capability on demand. The integration flow no longer calls the actual target service, but instead uses the mock service created by the mock generating unit 530.

Figure 6:
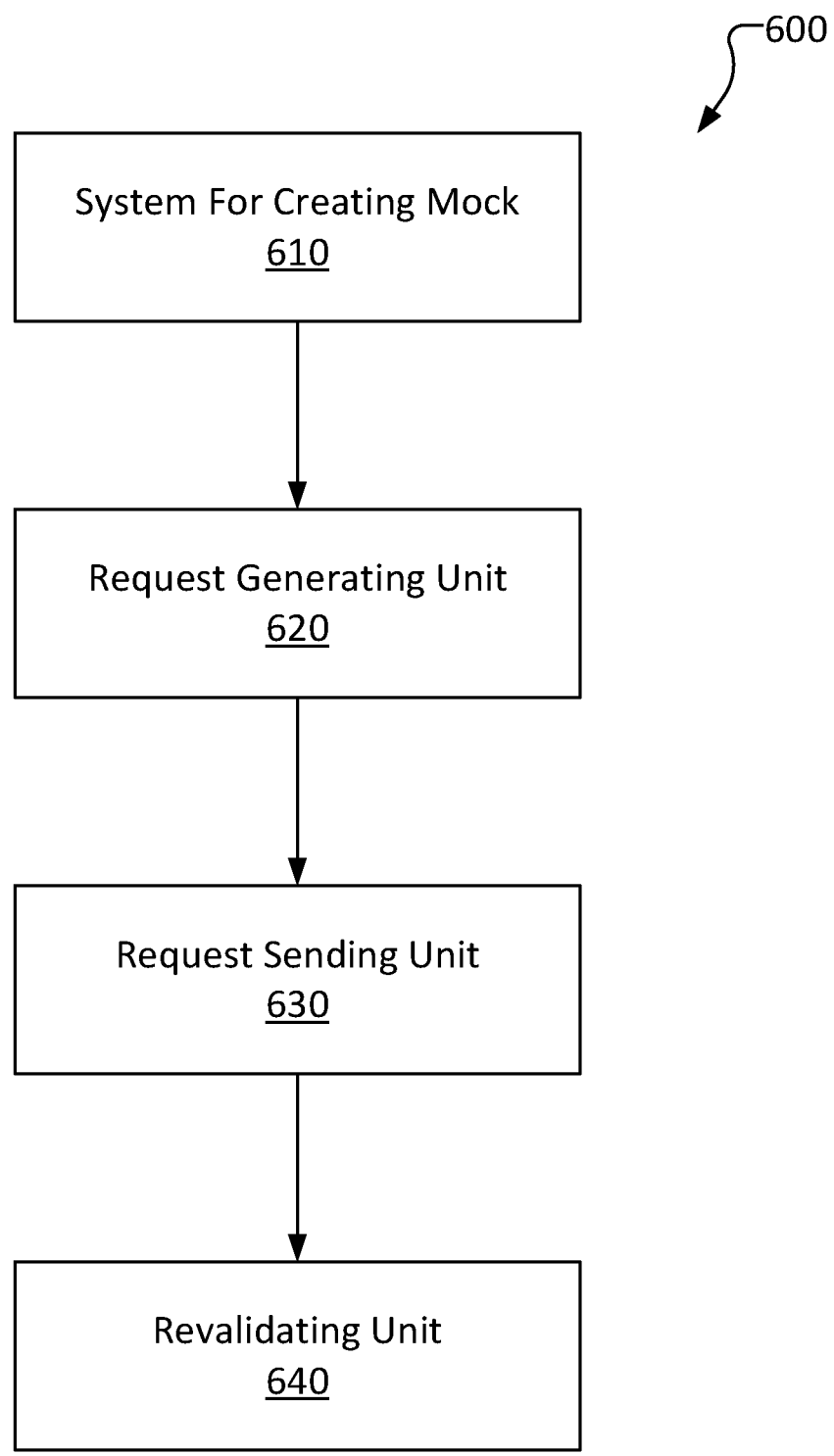
FIG. 6 illustrates a simplified block diagram of an exemplary embodiment of a system for revalidating a created mock for an integration flow.

FIG. 6 illustrates a simplified block diagram of an exemplary embodiment of a system 600 for revalidating a created mock for an integration flow.

System 600 comprises a system 610 for creating a mock for an integration flow, in accordance with the system depicted in FIG. 5. System 600 further comprises a request generating unit 620 configured to generate a simulated request based on the identifying property of each of the plurality of requests from the integration flow. System 600 further comprises a request sending unit 630 configured to send the simulated request to a real system, and a revalidating unit 640 configured to revalidate the created mock by assessing a response from the real system corresponding to the simulated request against a response from the created mock.

In an example, System 600 is used to ensure that the mock remains valid. The request generating unit 620 creates a simulated request based on the identifying property of each of the plurality of requests from the integration flow and/or re-uses data from the original recorded messages (i.e. real requests). The revalidating unit uses the simulated request and/or the real requests to call the actual service to validate that the mock actually matches the behavior of the real service.

Figure 7:
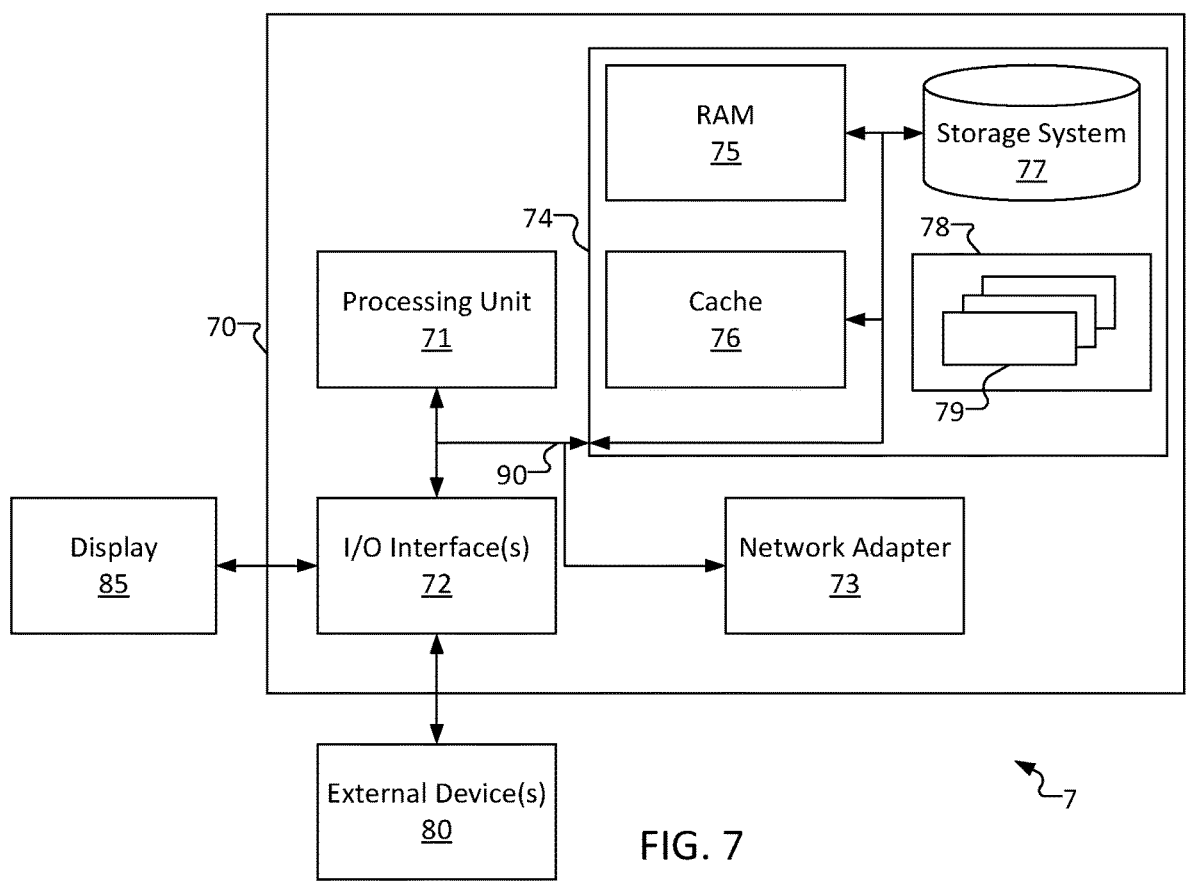
FIG. 7 is a block diagram of an example system in which aspects of the illustrative embodiments may be implemented.

FIG. 7 is a block diagram of an example system 7 in which aspects of the illustrative embodiments may be implemented. As illustrated in FIG. 7, embodiments may comprise a computer system/server 70, which may form part of a networked system 7. For instance, an identifying unit may be implemented by the computer system/server 70. The components of computer system/server 70 may include, but are not limited to, one or more processing arrangements, for example comprising processors or processing units 71, a system memory 74, and a bus 90 that couples various system components including system memory 74 to processing unit 71.

System memory 74 can include computer system readable media in the form of volatile memory, such as random access memory (RAM) 75 and/or cache memory 76. Computer system/server 70 may further include other removable/non-removable, volatile/non-volatile computer system storage media such as storage system 77. In such instances, each can be connected to bus 90 by one or more data media interfaces. The memory 74 may include at least one program product having a set (e.g., at least one) of program modules that are configured to carry out the functions of proposed embodiments. For instance, the memory 74 may include a computer program product having program executable by the processing unit 71 to cause the system to perform a method for creating a mock for an integration flow.

Program/utility 78, having a set (at least one) of program modules 79, may be stored in memory 74. Program modules 79 generally carry out the functions and/or methodologies of proposed embodiments for creating a mock for an integration flow.

Computer system/server 70 may also communicate with one or more displays such as display 85 and/or one or more external devices 80 such as a keyboard, a pointing device, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g. to communicate recreated content to a system or user).

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method, comprising:
analyzing a response to each of a plurality of requests from an integration flow;
determining that an identifying property of each of the plurality of requests is present in the response, the determining including identifying a difference between a first request and a second request of the plurality of requests; and
responsive to determining that the identifying property is present in the response, generating a mock with an associated matcher based on the plurality of requests.

2. The method of claim 1, wherein determining that an identifying property of each of the plurality of requests is present in the response further includes
determining whether or not the difference is present between a first response and a second response corresponding to the first request and the second request.

3. The method of claim 2, wherein identifying a difference between a first request and a second request of the plurality of requests comprises:
analyzing a first request and a second request of the plurality of requests from the integration flow; and
identifying a difference between the first request and the second request.

4. The method of claim 2, wherein determining whether or not the difference is present between a first response and a second response corresponding to the first request and the second request comprises:
identifying whether or not the difference correlates with the first response and the second response;
responsive to identifying that the difference correlates with the first response and the second response, categorizing the difference as an identifying property; and
responsive to identifying that the difference does not correlate with the first response and the second response, ignoring the difference.

5. The method of claim 4, wherein the difference that does not correlate with the first response and the second response comprises a timestamp.

6. The method of claim 1, wherein the identifying property of each of the plurality of requests comprises at least one of:
a correlation identifier;
a message identifier; and
a request type.

7. The method of claim 1, wherein generating a mock with an associated matcher based on the plurality of requests comprises:
generating a callable flow comprising the associated matcher based on the plurality of requests; and
returning expected data by way of the generated callable flow to the integration flow.

8. The method of claim 1, wherein generating a mock with an associated matcher based on the plurality of requests comprises generating the mock with an associated matcher by generating a simulated response to each of the plurality of requests based on the identifying property of each of the plurality of requests.

9. The method of claim 8, wherein the identifying property is correlated with the simulated response.

10. The method of claim 1, further comprising:
generating a simulated request based on the identifying property of each of the plurality of requests from the integration flow;
sending the simulated request to a real system; and
revalidating the mock by assessing a response from the real system corresponding to the simulated request against a response from the mock.

11. A computer program product, the computer program product comprising a computer readable storage medium having program instructions embodied therewith, the program instructions executable by a computer to cause the computer to:
analyze a response to each of a plurality of requests from an integration flow;
determine whether or not an identifying property of each of the plurality of requests is present in the response, the determining including identifying a difference between a first request and a second request of the plurality of requests; and
responsive to determining that the identifying property is present in the response, generate a mock with an associated matcher based on the plurality of requests.

12. A system for creating a mock for an integration flow, the system comprising:
a response analysis unit configured to analyze a response to each of a plurality of requests from an integration flow;
a property analysis unit configured to determine whether or not an identifying property of each of the plurality of requests is present in the response, the property analysis unit including a difference identifying unit configured to identify a difference between a first request and a second request of the plurality of requests; and
a mock generating unit configured to, responsive to determining that the identifying property is present in the response, generate a mock with an associated matcher based on the plurality of requests.

13. The system of claim 12, wherein the property analysis unit further includes
a difference analysis unit configured to determine whether or not the difference is present between a first response and a second response corresponding to the first request and the second request.

14. The system of claim 13, wherein the difference identifying unit comprises:
a request analysis unit configured to analyze a first request and a second request of the plurality of requests from the integration flow; and
wherein the difference identifying unit is further configured to identify a difference between the first request and the second request.

15. The system of claim 13, wherein the difference analysis unit comprises:

a correlation identifying unit configured to identify whether or not the difference correlates with the first response and the second response;

a categorizing unit configured to, responsive to identifying that the difference correlates with the first response and the second response, categorize the difference as an identifying property; and an ignoring unit configured to, responsive to identifying that the difference does not correlate with the first response and the second response, ignore the difference.

16. The system of claim 12, wherein the identifying property of each of the plurality of requests comprises at least one of:

a correlation identifier;

a message identifier; and a request type.

17. The system of claim 12, wherein the mock generating unit comprises:

a flow generating unit configured to generate a callable flow comprising the associated matcher based on the plurality of requests; and a data returning unit configured to return expected data by way of the generated callable flow to the integration flow.

18. The system of claim 12, wherein the mock generating unit comprises a response generating unit configured to generate the mock with an associated matcher by generating a simulated response to each of the plurality of requests based on the identifying property of each of the plurality of requests.

19. The system of claim 17, wherein the identifying property is correlated with the simulated response.

20. The system of claim 12, further comprising:

a request generating unit configured to generate a simulated request based on the identifying property of each of the plurality of requests from the integration flow;

a request sending unit configured to send the simulated request to a real system; and a revalidating unit configured to revalidate the mock by assessing a response from the real system corresponding to the simulated request against a response from the mock.

* * * * *